D. A. WOODBURY.

BALANCED SLIDE VALVE.

No. 10,661. Reissued Nov. 10, 1885.

WITNESSES:

W. H. Orchard

B. F. Ridley.

INVENTOR:

D. A. Woodbury

N. PETERS, Photo-Lithographer, Washington, D. C.

UNITED STATES PATENT OFFICE.

DANIEL A. WOODBURY, OF ROCHESTER, NEW YORK.

BALANCED SLIDE-VALVE.

SPECIFICATION forming part of Reissued Letters Patent No. 10,661, dated November 10, 1885.

Original No. 303,477, dated August 12, 1884. Application for reissue filed June 1, 1885. Serial No. 167,357.

*To all whom it may concern:*

Be it known that I, DANIEL A. WOODBURY, of Rochester, in the county of Monroe and State of New York, have invented certain new and useful Improvements in Balanced Slide-Valves for Steam-Engines, of which the following is a full, clear, and exact description.

My invention relates to slide-valves of that class in which the cut-off valve is seated upon the main or distributing valve. The object is to provide for relieving the sliding faces of both the main and cut-off valves to any desired extent by means under the control of the engineer, and so contrived as to accomplish the same by one movement of the adjusting device, all as hereinafter fully described.

Reference is to be had to the accompanying drawings, forming a part of this specification, in which similar letters of reference indicate corresponding parts in all the figures.

Figure 1:
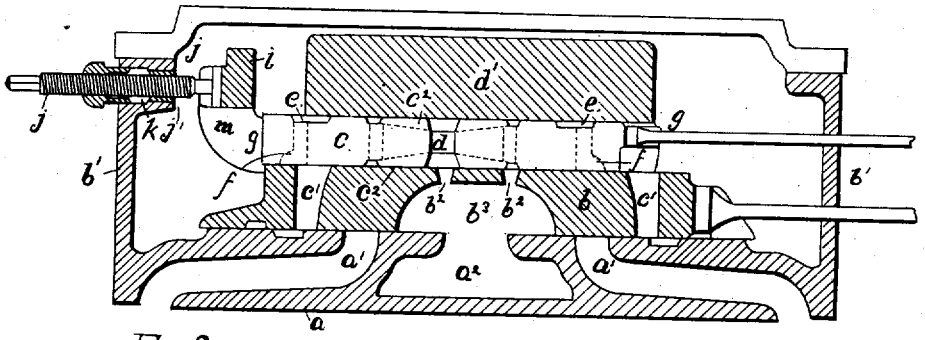
Figure 2:
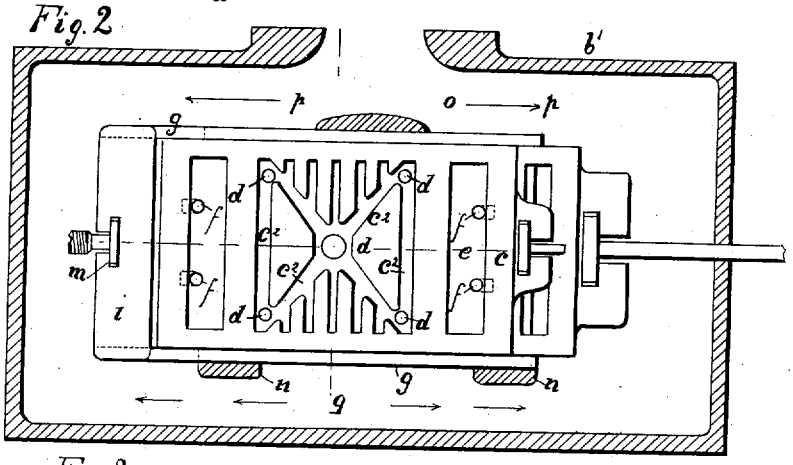
Figure 3:
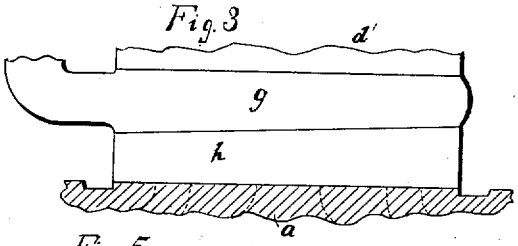
Figure 4:
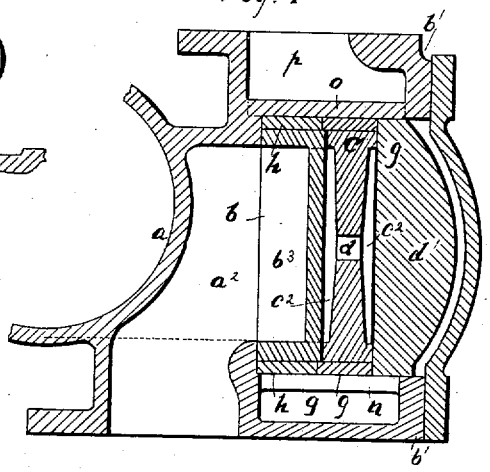
Figure 5:
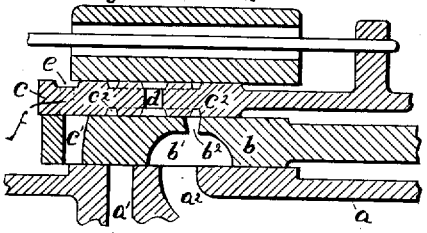

Figure 1 is a longitudinal horizontal section through a short or single D-valve, located upon the side of a steam-cylinder; Fig. 2, a longitudinal elevation through the valve-case and side elevation of the valves with the relief-plate removed, showing the back or plan of the cut-off valve. Fig. 3 is a detail illustrating the device for supporting and adjusting the relief-plate. Fig. 4 is a transverse section through the center of the valve-chest, valves, and cylinder. Fig. 5 is a longitudinal section through one end of a long or double D-valve, showing the manner of applying the invention to it.

The steam-cylinder $a$ is provided with the usual steam-ports, $a'$, and exhaust-port $a^2$, and in this example the steam-chest $b'$ is represented as being cast together with the cylinder; but it may be made separately, if preferred.

I propose to provide the main or distributing valve $b$ with one or more openings or passages, $b^2$, extending from the exhaust-cavity $b^3$ through to the back of the valve, in addition to the usual cut-off steam-passages, $c'$, and I construct the cut-off valve with a number of channels or grooves, $c^2$, on both of its faces, which grooves traverse an area equal, or nearly so, to the area of the exhaust-cavity $b^3$, said cut-off valve $c$ also having passages $d$ extending through the said valve or from one side to the other, for maintaining constant communication through the passages $b^2$ with the exhaust-cavity $b^3$, so that said grooves or channels $c^2$ will be filled with exhaust-steam at all times of the same pressure that prevails in said exhaust-cavity.

In the back of the cut-off valve $c$, I form recesses $e$, at suitable distances from the ends, which correspond in area with the area of the ports $c'$ at the back face of valve $b$, and I provide passages $f$ through valve $c$, through which said recesses $e$ are in constant communication with passages $c'$ during those portions of the stroke when the steam is cut off by the action of the valve $c$, thereby balancing the partial exhaust of the steam from the passages by the expansion of the steam in the cylinder. The relief-plate $d'$, of the usual form, with a plain working-face, is arranged over the cut-off valve $c$, said plate being secured from longitudinal movement in any convenient manner, which it is not necessary to show. This plate $d'$ is arranged upon wedges $g$, which may be so adjusted as to sustain the entire pressure of the steam upon said plate, or so much thereof as may be desired. The wedges $g$ may be supported in any approved way; but I prefer the independent supports $h$, of like thickness and metal as the wedges, so that they may expand freely and uniformly with the wedges.

That the relief may at all times be uniform over the entire surface, the wedges are arranged longitudinally and made of uniform taper throughout, so that the adjustment will affect the relief-plate equally at both ends. They are also made of sufficient length to prevent the rocking or alternate elevation and depression of the opposite ends of the relief-plate, by reason of the shifting position of the valve or valves beneath it.

The wedges $g$ are connected by the bar $i$ for being moved simultaneously by the adjusting device, that the opposite edges of the relief-plate $d'$ may also be equally affected by the adjustments. The bar takes hold upon the wedges by their outer edges and in connecting across between them is raised or offset sufficiently in the same direction to allow the valve to pass beneath it, as shown, thereby saving length and economizing space in the chest, rendering the whole construction more convenient and compact. The wedges are also so proportioned and arranged that the surfaces upon which the relief-plate bears is flush with the back of the valve. This enables the valves and wedges to be placed in position and the three surfaces finished by the same operation; also, in like manner, the entire surface of the relief-plate, thereby greatly facilitating the obtaining of a uniform fit and perfectly parallel surfaces.

In the construction as shown, the position of the wedges *g* are regulated by an adjusting-screw, *j*, connecting with the bar *i*, which screw extends out through a stuffing-box, *k*, and through a bush, *j'*, in the bottom of the box in which the screw works, to be screwed in or out by a wrench applied to the outer end of the screw. The screw *j* is connected to the cross-bar *i* by a collar, *m*, fitted in the slot of the bar, enabling the screw to draw the wedges back, as well as push them forward. The lower supporting-piece, *h*, and wedge *g* may be supported by the cross-bars *n*, and a central cross-bar, *o*, may be arranged over the upper supporting-piece and wedge for keeping them in place.

Steam-passages *p* and *q* are formed along between the sides of the valve and the valve-chest, which passages are so proportioned that the steam will divide into two currents, one flowing toward each end of the chest. This will induce a flow through the passage *q*, first in one direction and then in the other, as the steam alternately draws from the ends of the chest. This keeps the whole valve-system constantly surrounded by live steam, whereas otherwise the lower side might at times be immersed in water, and thus the expansion of the parts would be rendered unequal.

It will be seen that with the valves and adjusting devices constructed as shown the relief-plate may be adjusted so as to bear the entire pressure of the steam, and the cut-off valve may be completely relieved of the pressure, which is a consideration of great importance when the cut-off valve is operated automatically. There will still be a little pressure upon the working-face of the main valve, incident to the steam-ports *a'* of the cylinder, which pressure may be counteracted in part by increasing the area of the balancing-recesses $C^2$ in the cut-off valve or enlarging the outer ends of the passages C and the cavities *e*, or by both means. This pressure may be completely balanced by forming recesses of corresponding size to the ports *a'* in the backs of both the main and cut-off valves, with passages so arranged as to keep up a constant communication therewith. This, however, increases the complication of the parts and the liability to leakage, besides it is found better in practice to have a little pressure upon the working-face of the distributing-valve.

The proportions and arrangements of the parts are capable of a great variety of modifications to adapt this improved valve-system to different circumstances and requirements—as, for instance, the area of the channels or recesses $c^2$ might be elongated in the direction of movement of the valves, and narrowed in width, and the recesses *e* be divided and elongated in the same direction, and so extend along at the sides of the main recesses $c^2$; and I may form the outer recesses or channels, $c^2$, in the inner side or face of the relief-plate, or partly in the valve and partly in the plate, and the inner recesses, $c^2$, may be formed either in the face of the cut-off valve or in the back of the main distributing-valve, or in both.

A sufficient number of passages *d* may be provided in the cut-off valves, or they may be made long and narrow, or modified in many ways, the object always being to secure the best distribution with the least loss of wearing-surface. As the steam permeates the slight spaces between the channels or passages at a pressure corresponding with that prevailing in the passages, if well distributed along the edges of the area, the balance is as perfect as if the whole surface were removed. Under ordinary circumstances, however, the arrangement of recesses, passages, and grooves or channels, as shown and described, is to be preferred in practice.

The combination and arrangement of the relief-plate and wedges, and means for adjusting the same, can be applied with equal advantage to many other forms and arrangements of valves.

Having thus fully described my invention, I claim as new and desire to secure by Letters Patent—

1. The combination of the relief-plate *d'* and cut-off valve *c* with the main distributing-valve *b*, and suitable communicating openings and passages, whereby the exhaust cavity or cavities of the distributing-valve will be counterbalanced by the distribution of the exhaust-steam over areas at the inside of the relief-plate, and at each side of the cut-off valve, corresponding in extent, or nearly so, with the area of the exhaust cavity or cavities in the main distributing-valve, substantially as shown and described.

2. The cut-off valve *c*, having recesses *e* and passages *f*, in combination with the relief-plate *d'*, and with the distributing-valve *b*, having passages *c'*, substantially as described.

3. In a balanced slide-valve, the combination of the valve and relief-plate with the wedges *g*, placed longitudinally, and connecting-bar *i*, so arranged that the valve can pass under the bar, substantially as shown and described.

4. In a balanced slide-valve, the combination of the valve with the relief-plate and the wedges, the said wedges being placed longitudinally and so arranged that their outer surfaces will at some point in their adjusting movement be flush with the back of the valve, substantially as set forth, and for the purpose described.

5. In a balanced slide-valve, the combination, with the relief-plate $d'$ and adjusting-wedges $g$, of the independent supports $h$, substantially as described.

6. In a balanced slide-valve, with the valve or valves set upon edge and arranged on the side of the cylinder, the combination, with the relief-plate $d'$, wedges $g$, and supports $h$, of the passage or space $q$, arranged and operating substantially as described, and for the purpose set forth.

DANIEL A. WOODBURY.

Witnesses:

W. E. WOODBURY,

ALICE PLUNKETT.